US009323118B2

(12) United States Patent
Zhao

(10) Patent No.: US 9,323,118 B2
(45) Date of Patent: Apr. 26, 2016

(54) DISPLAY DEVICE

(71) Applicant: Boe Technology Group Co., Ltd., Beijing (CN)

(72) Inventor: Weili Zhao, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 14/094,233

(22) Filed: Dec. 2, 2013

(65) Prior Publication Data

US 2014/0152944 A1  Jun. 5, 2014

(30) Foreign Application Priority Data

Dec. 4, 2012 (CN) .......................... 2012 1 0513277

(51) Int. Cl.
G02F 1/1335 (2006.01)
G02F 1/1347 (2006.01)
G02F 1/137 (2006.01)

(52) U.S. Cl.
CPC .......... *G02F 1/1347* (2013.01); *G02F 1/13471* (2013.01); *G02F 1/13718* (2013.01); *G02F 2001/13478* (2013.01)

(58) Field of Classification Search
CPC .............. G02F 1/1347; G02F 1/13471; G02F 1/13718; G02B 5/3016
USPC .................. 349/74, 76, 98, 172, 175, 185
See application file for complete search history.

(56) References Cited

U.S. PATENT DOCUMENTS 6,094,244 A * 7/2000 Kawata et al. .................. 349/74
2008/0123025 A1 * 5/2008 Li et al. ............................ 349/74

(Continued)

FOREIGN PATENT DOCUMENTS

CN  201548791 U  8/2010
CN  102759823 A  10/2012

(Continued)

OTHER PUBLICATIONS

Office Action dated Sep. 24, 2014, for corresponding Chinese Application No. 201210513277.5.

(Continued)

*Primary Examiner* — Thanh-Nhan P Nguyen
(74) *Attorney, Agent, or Firm* — Kinney & Lange, P.A.

(57) ABSTRACT

Disclosed is a display device, comprising: two liquid crystal cells connected together and facing in opposite directions, each liquid crystal cell includes a substrate, a pixel electrode, a common electrode, and a cholesteric liquid crystal layer filled between the pixel electrode and the common electrode, the polarization properties of the filled cholesteric liquid crystals are opposite to each other. In the present invention, the two cholesteric liquid crystal cells are connected together, such that transparent display as well as double-side display can be achieved by using the reflective, polarizing and full stable performance of the cholesteric liquid crystals as well as by controlling voltage to switch two cholesteric liquid crystal cells between a plane orientation and a vertical orientation. In addition, with this technology, no polarizer is used and light absorption is removed, thus, the transmission rate of the display device is improved. Further, with this technology, no backlight is required, and the display is achieved by using the reflection-transmission of the cholesteric liquid crystals, therefore, energy is saved. Moreover, with this technology, no liquid-crystal-molecule alignment film is required and no rubbing process is required, therefore, the process is simplified.

8 Claims, 1 Drawing Sheet

(56) References Cited

U.S. PATENT DOCUMENTS

2011/0116018 A1* 5/2011 Kato et al. .................. 349/78
2012/0274887 A1 11/2012 Hwang et al.

FOREIGN PATENT DOCUMENTS

| CN | 102768429 A | 11/2012 |
| JP | H0434421 A | 2/1992 |
| JP | 2004045727 A | 2/2004 |

OTHER PUBLICATIONS

English translation of second Chinese Office Action dated Feb. 2, 2015, for corresponding Chinese Application No. 201210513277.5.

* cited by examiner

DISPLAY DEVICE

CROSS-REFERENCE TO RELATED APPLICATION

This application claims the benefit of Chinese Patent Application No. 201210513277.5 filed on Dec. 4, 2012 in the State Intellectual Property Office of China, the whole disclosure of which is incorporated herein by reference.

FIELD OF THE INVENTION

The present invention relates to the technical field of display, particularly to a display device.

DESCRIPTION OF THE RELATED ART

A cholesteric liquid crystal comprises a plurality of layers of molecules. Molecules of each layer are arranged in the same direction, but the direction in which the molecules in one layer is slightly rotated relative to the direction in which the molecules in a layer adjacent to the one layer so that the layers are laminated into a helical structure. When the direction in which the molecules are arranged is rotated by 360° and returns to its original direction, a pitch is defined. According to the spiral direction, the cholesteric liquid crystal is classified into a left-handed cholesteric liquid crystal and a right-handed cholesteric liquid crystal, which are capable of reflecting left-handed polarized light and right-handed polarized light respectively. Reflection of the cholesteric liquid crystal follows Bragg's law: $\lambda = n \times p$, wherein n is the average refractive index of the cholesteric liquid crystal, p is the pitch of the cholesteric liquid crystal. When the cholesteric liquid crystal comprises a series of liquid crystal molecules having different pitches, it is possible to reflect the entire visible wavelength band. A broadband reflective polarizer (BBP) can be made by using the reflection property of the cholesteric liquid crystal.

The cholesteric liquid crystal also has a bi-stable performance, that is, it can be in a planar texture (after a high voltage) or a focal conic texture (after a low voltage) when power is not supplied; it can be in a vertical arrangement orientation when power is supplied, which corresponds to an ordinary VA type liquid crystal.

SUMMARY OF THE INVENTION

The present invention provides a display device, including:
a first liquid crystal cell, comprising a first substrate, a first pixel electrode layer, a first common electrode layer and a first cholesteric liquid crystal layer filled between the first pixel electrode layer and the first common electrode layer; and
a second liquid crystal cell laminated with the first liquid crystal cell, comprising a second substrate, a second pixel electrode layer, a second common electrode layer and a second cholesteric liquid crystal layer filled between the second pixel electrode layer and the second common electrode layer,
wherein
the first pixel electrode layer of the first liquid crystal cell and the second pixel electrode layer of the second liquid crystal cell are laminated and connected with each other, a display surface of the first liquid crystal cell and a display surface of the second liquid crystal cell are oriented oppositely; and
the polarization property of the cholesteric liquid crystal filled in the first cholesteric liquid crystal layer is opposite to that of the cholesteric liquid crystal filled in the second cholesteric liquid crystal layer.

Alternatively, the first substrate, the first pixel electrode layer, the first common electrode layer, the second substrate, the second pixel electrode layer, and the second common electrode layer are colorless and transparent.

Alternatively, the first pixel electrode layer of the first liquid crystal cell and the second pixel electrode layer of the second liquid crystal cell are laminated and connected with each other to form a common pixel electrode layer of the first liquid crystal cell and the second liquid crystal cell, the first cholesteric liquid crystal layer and the second cholesteric liquid crystal layer are provided at two sides of the common pixel electrode layer respectively, wherein the two liquid crystal cells are connected integrally via the common pixel electrode layer. Further alternatively, the first substrate, the first common electrode layer, the second substrate, the second common electrode layer and the common electrode pixel layer are colorless and transparent.

Alternatively, the common pixel electrode layer is provided at one side of the first cholesteric liquid crystal layer, the first common electrode layer is provided at the other side of the first cholesteric liquid crystal layer, the first substrate is provided at aside of the first common electrode layer which is away from the first cholesteric liquid crystal layer; the common pixel electrode layer is provided at one side of the second cholesteric liquid crystal layer, the second common electrode layer is provided at the other side of the second cholesteric liquid crystal layer, the second substrate is provided at aside of the second common electrode layer which is away from the second cholesteric liquid crystal layer. Further alternatively, the first substrate, the first common electrode layer, the second substrate, the second common electrode layer and the common electrode pixel layer are colorless and transparent.

Alternatively, the common pixel electrode layer comprises a third substrate, and the first pixel electrode layer and the second pixel electrode layer which are formed at two sides of the third substrate respectively, the first pixel electrode layer and the second the pixel electrode layer formed at two sides of the third substrate side of are electrically connected outside a display area. Further alternatively, the first substrate, the first common electrode layer, the second substrate, the second common electrode layer and the common electrode pixel layer are colorless and transparent.

REFERENCE NUMERALS

Figure 1:
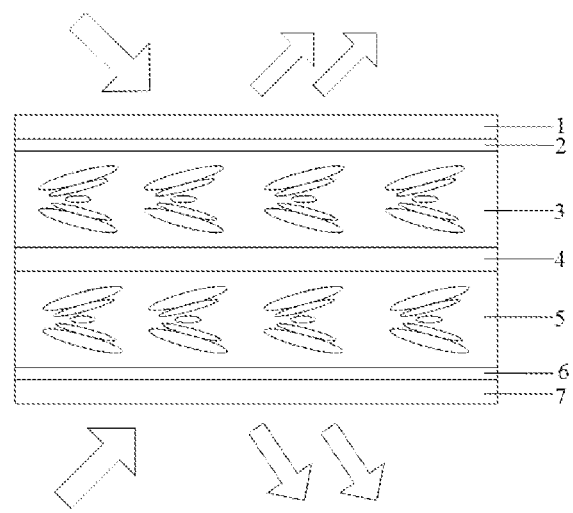
FIG. 1 is a schematic structural diagram showing a display device according to one exemplary embodiment of the present invention, which is in a reflection state.

1: first substrate;
2: first common electrode;
3: first liquid crystal layer;
4: common pixel electrode layer;
5: second liquid crystal layer;
6: second common electrode;

7: second substrate;
41: first pixel electrode layer;
42: second pixel electrode layer;
43: third substrate.

DETAILED DESCRIPTION OF PREFERRED EMBODIMENTS OF THE INVENTION

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

Figure 2:
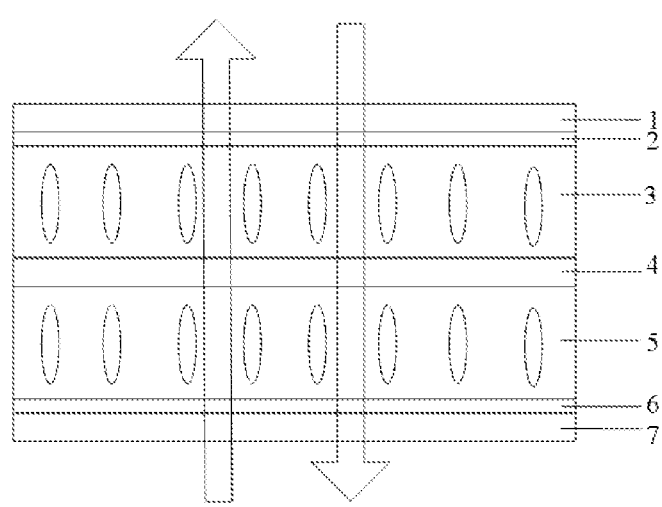
FIG. 2 is a schematic structural diagram showing the display device in FIG. 1, wherein the display device is in a transparent state.
Figure 3:
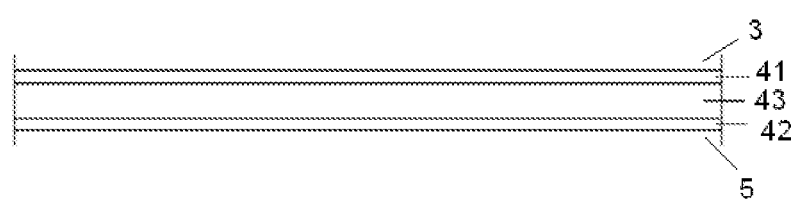
FIG. 3 is an enlarged schematic diagram of the display device in FIG. 1, showing the structure of the common pixel electrode layer.

FIGS. 1-3 illustrate structure diagrams of display devices according to exemplary embodiments of the present invention.

Referring to FIGS. 1-3, the display device comprises two liquid crystal cells connected with each other, and the display surface of the first liquid crystal cell and the display surface of the second liquid crystal cell are oriented oppositely. For the purpose of description, the upper liquid crystal cell in FIG. 1 and FIG. 2 is the first liquid crystal cell, and the other liquid crystal cell is the second liquid crystal cell. The first liquid crystal cell comprises a first substrate 1, a first common electrode layer 2, a first liquid crystal layer 3 and a first pixel electrode layer 41; and the second liquid crystal cell comprises a second substrate 7, a second common electrode layer 6, a second liquid crystal layer 5 and a second pixel electrode layer 42.

In order to reduce the thickness of the display device according to this embodiment and to simplify manufacturing process and reduce production cost, however, the first liquid crystal cell and the second liquid crystal cell may share a common pixel electrode layer 4, such that the first liquid crystal cell and the second liquid crystal cell are connected integrally via the common pixel electrode layer 4.

As shown in FIG. 3, the common pixel electrode layer 4 may include a first pixel electrode layer 41 and a second pixel electrode layer 42 formed respectively at two sides of a third substrate 43 which is between the first liquid crystal layer 3 and the second liquid crystal layer 5, the first and second pixel electrode layers 41 and 42 may be electrically connected outside a display region.

It is noted that the common pixel electrode layer 4 may only comprise one of the first pixel electrode layer 41 and the second pixel electrode layer 42, the one pixel electrode layer is directly connected between the first and second liquid crystal layers 3 and 5. Further, the display device may not comprise a common pixel electrode, that is, the first and second liquid crystal cells may have their own pixel electrode layers which are not electrically connected.

The first liquid crystal layer 3 and the second liquid crystal layer 5 are filled with cholesteric liquid crystal respectively. The cholesteric liquid crystal has broadband reflectivity. The polarizing performance of the cholesteric liquid crystal in the first liquid crystal layer 3 and that of the cholesteric liquid crystal in the second liquid crystal layer 5 are set to be opposite to each other, for example, to reflect left-handed polarized light and right-handed polarized light respectively. The transparent state and the double-side display state of the display device according to the present embodiment can be achieved by switching electrode voltages of the two liquid crystal cells.

The cholesteric liquid crystal has reflective characteristic, that is, the left-handed cholesteric liquid crystal reflects left-handed polarized light and allows right-handed polarized light to transmit through; and the right-handed cholesteric liquid crystal reflects right-handed polarized light and allows left-handed polarized light to transmit through. Reflection of the cholesteric liquid crystal follows Bragg's law: $\lambda=n\times p$, wherein n is the average refractive index of the cholesteric liquid crystal, p is the pitch of the cholesteric liquid crystal. When the cholesteric liquid crystal comprises a series of liquid crystal molecules having different pitches, it is possible to reflect the entire visible wavelength band.

The cholesteric liquid crystal also has a bi-stable performance, that is, it can be in a planar texture (after a high voltage) or a focal conic texture (after a low voltage) when power is not supplied, which means it is in a reflection state; and it can be in a vertical arrangement orientation when power is supplied, which means it is in a transparent state.

In the display device of the present embodiment, the reflective property and the bi-stable property of the cholesteric liquid crystal are used, two cholesteric liquid crystal cells with opposite polarization properties are laminated, and the two cholesteric liquid crystal cells are switchable between the reflective state and the transparent state by controlling voltage. FIG. 1 shows a display state in which display contents can be viewed from two sides of the display device. According to this embodiment, the two liquid crystal cells have the same common pixel electrode 4; therefore, the display contents viewed from the two sides of the display device are the same.

FIG. 1 is a schematic structural diagram showing in detail the display device according to one exemplary embodiment of the present invention, wherein the display device is in a display state, and wherein when power is not applied, the cholesteric liquid crystal cells having opposite polarization properties are in the planar orientation, as one of the bi-stable state. Here and hereinafter, the first liquid crystal cell is the left-handed cholesteric liquid crystal, and the second liquid crystal cell is the right-handed cholesteric liquid crystal (vice versa). The ambient light entering from one side of the first liquid crystal cell into the display device is incident on the left-handed cholesteric liquid crystal cell, such that the left-handed polarized light is reflected and the right-handed polarized light transmits through it; then the transmitted right-handed polarized light is reflected back to the first liquid crystal cell by the right-handed cholesteric liquid crystal of the second liquid crystal cell, and then emitting out from the first liquid crystal cell, therefore, both the left-handed polarized light and the right-handed polarized light in the ambient light are reflected back. When the ambient light enters from one side of the second liquid crystal cell into the display device, the display device has a similar effect. Based on the above analysis, the display device according to the present embodiment may achieve a double-side display, without a polarizer and backlight.

FIG. 2 shows in detail a schematic structure diagram of the display device in FIG. 2, wherein the display device is in the transparent state, and wherein when the two cholesteric liquid crystal cells having opposite polarization properties are supplied with power, the liquid crystals are in a vertical orientation to represent a transparent state. The ambient light entering into the display device from one side of the first liquid crystal cell can transmit through the two liquid crystal cells and emit out from one side of the second liquid crystal cell; similarly, the ambient light entering into the display device from one side of the second liquid crystal cell can transmit through the two liquid crystal cells and emit out from one side of the first liquid crystal cell. And when the substrate, the pixel electrode, the common electrode are in colorless and transparent state, the transparent state of the display device is achieved.

As can be seen from the above embodiments of the present invention, two cholesteric liquid crystal cells are connected together, thus the transparent state and double-side display state can be achieved by using the reflective, polarizing and full stable performance of the cholesteric liquid crystals, and by controlling voltage to switch the two cholesteric liquid crystal cells between the plane texture and the vertical orientation. In addition, with this technology, no polarizer is used and light absorption is removed, thus, the transmission rate of the display device is improved. Further, with this technology, no backlight is required, and the display is achieved by using the reflection-transmission of the cholesteric liquid crystals, therefore, energy is saved. Moreover, with this technology, no liquid-crystal-molecule alignment film is required and no rubbing process is required, therefore, the process is simplified.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

What is claimed is:

1. A display device providing a double-sided display, comprising:
    a first liquid crystal cell, comprising a first substrate, a first pixel electrode layer, a first common electrode layer and a first cholesteric liquid crystal layer filled between the first pixel electrode layer and the first common electrode layer; and
    a second liquid crystal cell laminated with the first liquid crystal cell, comprising a second substrate, a second pixel electrode layer, a second common electrode layer and a second cholesteric liquid crystal layer filled between the second pixel electrode layer and the second common electrode layer,
    wherein
    the first pixel electrode layer of the first liquid crystal cell and the second pixel electrode layer of the second liquid crystal cell are laminated and connected with each other, and a display surface of the first liquid crystal cell providing a first display side of the double-sided display and a display surface of the second liquid crystal cell providing a second display side of the double-sided display are oriented oppositely; and
    the polarization property of the cholesteric liquid crystal filled in the first cholesteric liquid crystal layer is opposite to that of the cholesteric liquid crystal filled in the second cholesteric liquid crystal layer, wherein a transparent state and a double-side display state are achieved by controlling voltage to switch the cholesteric liquid crystal within the respective two cholesteric crystal cells between a plane texture and a vertical orientation.

2. The display device of claim 1, wherein:
the first pixel electrode layer of the first liquid crystal cell and the second pixel electrode layer of the second liquid crystal cell are laminated and connected with each other to form a common pixel electrode layer of the first liquid crystal cell and the second liquid crystal cell, the first cholesteric liquid crystal layer and the second cholesteric liquid crystal layer are provided at two sides of the common pixel electrode layer respectively.

3. The display device of claim 2, wherein:
the common pixel electrode layer is provided at one side of the first cholesteric liquid crystal layer, the first common electrode layer is provided at the other side of the first cholesteric liquid crystal layer, the first substrate is provided at a side of the first common electrode layer which is away from the first cholesteric liquid crystal layer;
the common pixel electrode layer is provided at one side of the second cholesteric liquid crystal layer, the second common electrode layer is provided at the other side of the second cholesteric liquid crystal layer, the second substrate is provided at a side of the second common electrode layer which is away from the second cholesteric liquid crystal layer.

4. The display device of claim 3, wherein:
the common pixel electrode layer comprises a third substrate, and the first pixel electrode layer and the second pixel electrode layer which are formed at two sides of the third substrate respectively, the first pixel electrode layer and the second the pixel electrode layer formed at two sides of the third substrate side of are electrically connected outside a display area.

5. The display device of claim 4, wherein:
the first substrate, the first common electrode layer, the second substrate, the second common electrode layer and the common electrode pixel layer are colorless and transparent.

6. The display device of claim 3, wherein:
the first substrate, the first common electrode layer, the second substrate, the second common electrode layer and the common electrode pixel layer are colorless and transparent.

7. The display device of claim 2, wherein:
the first substrate, the first common electrode layer, the second substrate, the second common electrode layer and the common electrode pixel layer are colorless and transparent.

8. The display device of claim 1, wherein:
the first substrate, the first pixel electrode layer, the first common electrode layer, the second substrate, the second pixel electrode layer, and the second common electrode layer are colorless and transparent.

* * * * *